United States Patent [19]
Nakamura et al.

[11] Patent Number: 5,652,290
[45] Date of Patent: Jul. 29, 1997

[54] THERMALLY CONDUCTIVE SILICONE RUBBER COMPOSITIONS WITH LOW PERMANENT COMPRESSION STRAIN RATIOS

[75] Inventors: Akito Nakamura; Yoshito Ushio, both of Chiba Perfecture, Japan

[73] Assignee: Dow Corning Toray Silicone Co., Ltd., Tokyo, Japan

[21] Appl. No.: 543,994

[22] Filed: Oct. 17, 1995

[30] Foreign Application Priority Data

Nov. 11, 1994 [JP] Japan ................................ 6-303228

[51] Int. Cl.⁶ .............................. C08K 3/10; H01B 1/06
[52] U.S. Cl. .......................... 524/437; 524/430; 524/588; 524/786; 524/860; 252/511; 252/518
[58] Field of Search ............................ 524/430, 588, 524/860, 437, 786; 252/518, 511

[56] References Cited

U.S. PATENT DOCUMENTS

| | | | |
|---|---|---|---|
| 4,588,768 | 5/1986 | Streusand | 524/443 |
| 4,956,203 | 9/1990 | Kroupa | 427/221 |
| 5,436,288 | 7/1995 | Takahashi et al. | 524/300 |

FOREIGN PATENT DOCUMENTS 1215855  8/1989  Japan.

*Primary Examiner*—Karen A. Dean
*Attorney, Agent, or Firm*—Robert L. McKellar

[57] ABSTRACT

Thermally conductive silicone rubber compositions, curable to elastomers having low permanent compression strain ratios, consisting of a polyorganosiloxane, a thermally conductive inorganic filler, an organosilicon compound having in each molecule at least three groups represented by the general formula of $HR^1{}_2Si$, and an organic peroxide.

12 Claims, No Drawings

THERMALLY CONDUCTIVE SILICONE RUBBER COMPOSITIONS WITH LOW PERMANENT COMPRESSION STRAIN RATIOS

BACKGROUND OF THE INVENTION

1. Field of the Invention

This invention relates to thermally conductive silicone rubber compositions. More specifically, this invention relates to thermally conductive silicone rubber compositions that yield elastomers with low permanent compression strain ratios upon cure.

2. Description of the Prior Art

Silicone rubber compositions that are cured with organic peroxides are known in the art, as is the fact that the curing of such compositions can be accelerated by heat. Such silicone rubbers are used in many applications. In order to increase the thermal conductivity of these silicone rubbers, many investigations have been made on thermally conductive silicone rubber compositions obtained by the blending of alumina, zinc oxide, silica and other thermally conductive inorganic fillers.

Streusand teaches in Japanese Kokai Patent Application No. Sho 61-108662, published on Oct. 29, 1986, a thermally conductive silicone rubber composition consisting of a polyorganosiloxane, silicon nitride and an organic peroxide.

Takamura et al. teach in Japanese Kokai Patent Application No. Hei 01-215855, published on Feb. 23, 1989, a thermally conductive silicone rubber composition consisting of a polyorganosiloxane; a polyorganosiloxane with the molar ratio of $SiO_{4/2}$ units to $R_3SiO_{1/2}$ units of 1:0.4 to 1:1.5, where R is a hydrogen atom or a monovalent hydrocarbon group; alumina; magnesium oxide; zinc oxide; other thermally conductive inorganic fillers; and organic peroxides.

The thermally conductive silicone rubbers obtained after curing the compositions disclosed in Japanese Kokai Patent Application Nos. Sho 61-108662 and Hei 01-215855, at elevated temperatures, have high permanent compression strain ratios. When alumina is used as the thermally conductive inorganic filler in the compositions disclosed in the above mentioned Japanese patent applications, the problem of high permanent compression strain ratio is especially pronounced.

SUMMARY OF THE INVENTION

Various methods were examined by the inventors in order to develop a thermally conductive silicone rubber composition which would not exhibit the conventional drawbacks or problems. This invention was thus developed as a result.

The objective of the present invention is to provide thermally conductive silicone rubbers with low permanent compression strain ratios.

The present invention relates to thermally conductive silicone rubber compositions consisting of (A) 100 parts by weight of a polyorganosiloxane having an average unit formula of $$R^1_a SiO_{(4-a)/2}$$

where each $R^1$ is individually selected from the group consisting of substituted and unsubstituted monovalent hydrocarbon groups, and a is a number between 1.8 and 2.3; (B) 10–500 parts by weight of a thermally conductive inorganic filler; (C) 0.01–50 parts by weight of an organosilicon compound having in each molecule at least 3 groups represented by the general formula:

$$HR^1_2Si$$

where $R^1$ is as defined above; and (D) an amount of an organic peroxide sufficient to cure the composition.

DETAILED DESCRIPTION OF THE INVENTION

COMPONENT A

The polyorganosiloxane of component (A) is the main ingredient of the present composition. It is represented by the average unit formula of $$R^1_a SiO_{(4-a)/2}$$

where $R^1$ is a substituted or unsubstituted monovalent hydrocarbon group. The radical groups represented by $R^1$ include, but are not limited to, methyl, ethyl, propyl, butyl, pentyl, hexyl, vinyl, allyl, butenyl, pentenyl, hexenyl, phenyl, tolyl, xylyl, naphthyl, cyclopentyl, cyclohexyl, benzyl, phenethyl, 3-chloropropyl and 3,3,3-trifluoropropyl. The preferred $R^1$ is selected from the group consisting of methyl, vinyl, phenyl and 3,3,3-trifluoropropyl. In a more preferred embodiment of the present invention, at least on $R^1$ is a vinyl group. Such compositions exhibit extremely low permanent compression strain ratios. The a in the above formula is a number from 1.8 to 2.3. The molecular structure of component (A) includes, but is not limited to, straight chains, straight chain having some branching, branched structures, and mixtures thereof. In preferred embodiments, the molecular structure of the molecules comprising component (A) are straight chained.

Component (A) is a high molecular weight polymer that consists mainly of $R^1_2SiO_{2/2}$ units. Component (A) may contain a small number of $R^1_3SiO_{1/2}$ units and/or $R^1_2(HO)SiO_{1/2}$ units, as well as other siloxane units. In certain instances, component (A) may contain a small amount of $R^1SiO_{3/2}$ units and/or $SiO_{4/2}$ units. Component (A) is selected from the group consisting of siloxane-unit-containing polymers and blends of siloxane-unit-containing polymers. By the term "siloxane-unit-containing polymers" it is meant those polymers containing one or more of any of the aforementioned siloxanes units.

Before being combined with the other components of the present invention, component (A) is in an uncured rubber state. In preferred embodiments of the present invention, the degree of polymerization of component (A) is greater than or equal to 1,000. In more preferred embodiments, the degree of polymerization of component (A) is greater than or equal to 2000.

The preferred component (A) is selected from the group consisting of trimethylsiloxy-terminated dimethylpolysiloxane, trimethylsiloxy-terminated dimethysiloxane-methylvinylsiloxane copolymer, trimethylsiloxy-terminated methylphenylpolysiloxane, trimethylsiloxy-terminated dimethylsiloxane-methylphenylsiloxane copolymer, trimethylsiloxy-terminated dimethylsiloxane-methyl (3,3,3-trifluoropropyl) siloxane copolymer, trimethylsiloxy-terminated dimethylsiloxane-methylvinylsiloxane-methylphenylsiloxane copolymer, dimethylvinylsiloxy-terminated dimethylpolysiloxane, dimethylvinylsiloxy-terminated dimethylsiloxane-methylvinylsiloxane copolymer, dimethylvinylsiloxy-terminated methylphenylpolysiloxane, dimethylvinylsiloxy-terminated dimethylsiloxane-methylphenylsiloxane copolymer, dimethylvinylsiloxy-terminated dimethylsiloxane-methyl(3,3,3-trifluoropropyl)siloxane copolymer, dimethylvinylsiloxy-terminated dimethylsiloxane-methylvinylsiloxane-methylphenylsiloxane copolymer, silanol-terminated dimethylpolysiloxane, silanol-terminated dimethylsiloxane-methylvinylsiloxane copolymer, silanol-terminated methylphenylpolysiloxane, silanol-terminated dimethylsiloxane-methylphenylsiloxane copolymer, silanol-terminated dimethylsiloxane-methyl(3,3,3-trifluoropropyl)siloxane copolymer, and silanol-terminated dimethylsiloxane-methylvinylsiloxane-methylphenylsiloxane copolymer.

COMPONENT (B)

Component (B) is a thermally conductive inorganic filler. It is used to increase the thermal conductive of the composition. Component (B) includes, but is not limited to, alumina, zinc oxide, aluminum hydroxide, quartz, magnesium oxide, silicon nitride, aluminum nitride, boron nitride, silicon carbide and mixtures thereof. In a preferred embodiment of the present invention, component (B) is comprised of alumina. For uniform blending with component (A), it is preferable that the average particle diameter of the inorganic filler comprising component (B) be in the range of 0.01 to 100 μm, inclusive. In a more preferred embodiment, the average diameter of the particles comprising component (B) ranges from 0.1 to 20 μm, inclusive.

The composition of the present invention contains 10 to 500 parts by weight of component (B). This is because if component (B) comprises less than 10 parts by weight with respect to 100 parts by weight of component (A), the silicone rubber obtained does not exhibit a sufficient thermal conductivity. Moreover, if component (B) comprises more than 500 parts by weight, it will be very difficult to blend or mix the composition of the present invention. A range of 50 to 400 parts by weight of component (B) is preferred.

COMPONENT C

Component (C) is an organosilicon compound. It is used to decrease the permanent compression strain ratios of the thermally conductive silicone rubbers obtained by curing the compositions of the present invention. In each molecule of component (C), there are at least three groups represented by the general formula $HR^1_2Si$ 

where $R^1$ is as described above. The preferred $R^1$ in the formula $HR^1_2Si$ is a methyl group. In order to achieve uniform blending with component (A) and to minimize the amount of component (C) needed to be effective, the preferred component (C) is selected from the group consisting of organosilicon compounds represented by the general formula $(HR^1_2SiO)_xR^1_{(4-x)}Si$ where $R^1$ is as described above and x is 3 or 4; and organosilicon compounds represented by the general formula $(HR^1_2SiO)_3Si\text{-}R_2\text{-}Si(OSiR^{12}H)_3$ 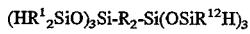

where $R^1$ is as described above and, $R^2$ is an alkylene group. In preferred embodiments, $R^1$ in the organosilicon compounds represented by the general formula $(HR^1_2SiO)_xR^1_{(4-x)}Si$ 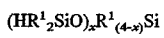

is a methyl radical and the x in the formula has a value of 3 or 4. In more preferred embodiments, the x is the above formula has a value of 4. Such preferred and more preferred organosilicons include, but are not limited to,

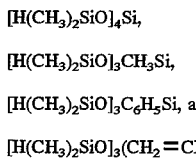

[H(CH$_3$)$_2$SiO]$_4$Si,

[H(CH$_3$)$_2$SiO]$_3$CH$_3$Si,

[H(CH$_3$)$_2$SiO]$_3$C$_6$H$_5$Si, and

[H(CH$_3$)$_2$SiO]$_3$(CH$_2$=CH)Si.

These organosilicon compounds can be synthesized by reaction of a disiloxane represented by the general formula $HR^1_2SiOSiR^1_2H$ 

where $R^1$ is as described above, and an organosilicon compound represented by the general formula $(R^3O)_xR^1_{(4-x)}Si$ 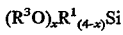

where $R^1$ is as described above and $R^3$ is an alkyl group, in the presence of an acid catalyst. The preferred $R^3$ is selected from the group consisting of methyl, ethyl, and propyl radicals. The preferred x in the above formula is 3 or 4. The acid catalysts that may be used include, but are not limited to, hydrochloric acid, sulfuric acid, nitric acid, and activated white clay.

In the organosilicon compounds represented by the general formula $(HR^1_2SiO)_3Si\text{-}R^2\text{-}Si(OSiR^1_2H)_3$ 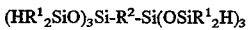

$R^1$ is as described above, and $R^2$ is an alkylene group. The alkylene groups represented by $R^2$ include, but are not limited to, ethylene, propylene, butylene, pentylene, and hexylene. The organosilicon compounds represented by the general formula $(HR^1_2SiO)_3Si\text{-}R^2\text{-}Si(OSiR^1_2H)_3$ include, but are not limited to

[H(CH$_3$)$_2$SiO]$_3$Si—C$_2$H$_4$—Si[OSi(CH$_3$)$_2$H]$_3$,

[H(CH$_3$)$_2$SiO]$_3$Si—C$_3$H$_6$—Si[OSi(CH$_3$)$_2$H]$_3$,

[H(CH$_3$)$_2$SiO]$_3$Si—C$_4$H$_8$—Si[OSi(CH$_3$)$_2$H]$_3$,

[H(CH$_3$)$_2$SiO]$_3$Si—C$_5$H$_{10}$—Si[OSi(CH$_3$)$_2$H]$_3$, and

[H(CH$_3$)$_2$SiO]$_3$Si—C$_6$H$_{12}$—Si[OSi(CH$_3$)$_2$H]$_3$.

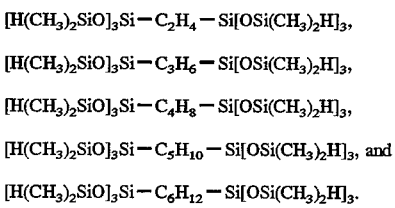

These organosilicon compounds can be synthesized by the reaction of a disiloxane represented by the general formula $HR^1_2SiOSiR^1_2H$ 

where $R^1$ is as described above, with an organosilicon compound represented by the general formula $(R^3O)_3Si\text{-}R^2\text{-}Si(OR^3)_3$ 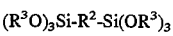

where $R^2$ and $R^3$ are as described above, in the presence of an acid catalyst. The acid catalyst includes, but is not limited to, the acid catalysts mentioned above.

The compositions of the present invention contain 0.01 to 50 parts by weight of component (C) with respect to 100 parts of component (A). If component (C) comprises less than 0.01 parts by weight with respect to 100 parts by weight of component (A), the object of the present invention cannot be achieved. If component (C) comprises more than 50 parts by weight, component (C) may bleed out of the elastomer obtained when the composition of the present invention is cured. In addition, if component (C) comprises more than 50 parts by weight with respect to 100 parts by weight of component (A), the mechanical properties of the elastomer obtained when the composition of the present invention is cured will be poor. A range of 0.1 to 10 parts by weight of component (C) is preferred.

COMPONENT D

The organic peroxide of component (D) functions as a curing agent for the present invention. The organic peroxide compounds represented by component (D) include, but are not limited to, t-butyl hydroxyperoxide, cumene hydroperoxide, di-i-propylbenzone hydroperoxide, p-menthane hydroperoxide, 2,5-dimethyl-2,5-dihydroperoxyhexane, 2,5-dimethyl-2,5-dihydroperoxy-3-hexene, pinene hydroperoxide, i-butyl peroxide, di-t-butyl peroxide, di-t-amyl peroxide, t-butyl umyl peroxide, dicumyl peroxide, 2,5-dimethyl-2,5-di(t-butylperoxy) hexane, 2,5-dimethyl-2,5-di(t-butylperoxy)-3-hexene, α,α'-bis(t-butylperoxy) di(i-butylperoxy)benzene, 1,1-bis(t-butylperoxy)-3,3,5-trimethyl cyclohexane, n-butyl-4,4'-bis (t-butylperoxy) valerate, 2,2-bis (4,4-di-t-butylperoxycyclohexyl)propane, 2,2-(t-butylperoxy) butane, 1,1-di(t-butylperoxy) cyclohexane, caprylide peroxide, lauroyl peroxide, stearoyl peroxide, succinic acid peroxide, benzoyl peroxide, p-chlorobenzoyl peroxide, o-chlorobenzoyl peroxide, 2,4-dichlorobenzoyl peroxide, octanoyl peroxide, t-butyl peroxyacetate, t-butyl peroxy-2-ethylhexanoate, t-butyl peroxylaurate, t-butyl peroxybenzoate, di-t-butyl diperoxy phthalate, 2,5-dimethyl-2,5-di(benzoylperoxy) hexane, t-butyl peroxymaleate, t-butyl peroxy i-propyl carbonate, t-butyl peroxypivalate, t-butyl peroxyneodecanote, diisopropyl peroxydicarbonate, di-2-ethylhexyl peroxydicarbonate, ketone peroxides and mixtures thereof. In order to minimixe the permanent compression strain ratios of the thermally conductive elastomers obtained when the compositions of the present invention are cured, the preferred component (D) is an alkyl peroxide. If component (D) cannot be uniformly blended in component (A), component (D) may be made into a paste by blending it with a low-viscosity polyorganosiloxane. This paste will be more easily blended into component (A).

The composition of the present invention preferably contains 0.1 to 10 parts by weight of component (D) with respect to 100 parts of component (A). If component (D) comprises less than 0.1 parts by weight with respect to 100 parts by weight of component (A), the curing characteristics of the composition obtained will be significantly decreased. Although compositions comprising more than 10 parts by weight of component (D) will cure, additional component (D) will not significantly improve the cure characterists, but will increase the cost of the present composition. A range of 0.5 to 5 parts by weight of component (D) is more preferred.

OPTIONAL INGREDIENTS

In addition to components (A) through (D), the composition of the present invention may also include additional components. These optional components include, but are not limited to, fillers, adhesion promoters, heat resistance agents, flame retardants, plasticizers, processing aids and diluents. Additional fillers, other than component (B) may be added to the composition of the present invention as long as the object of the present invention is not destroyed. Additional fillers that may be added to the composition of the present invention include, but are not limited to, moist silica, wet silica, moist titanium oxide, fumed silica, fused silica, titanium oxide, zinc carbonate, magnesium carbonate, calcium carbonate, diatomaceous earth, calcium silicate, magnesium silicate, aluminum silicate, mica, talc, clay, bentonite, pulverized glass, glass fibers, carbon black, carbon fibers, polyester fibers, polytetrafluoroethylene resin powders, polyvinyl chloride resin powders, and the fillers obtained by the hydrophobic treatment on the surface with organoalkoxysilanes, organochlorosilanes, organosilazanes, organopolysiloxanes, organocyclosiloxanes and/or other organosilicon compounds. One or more of the above mentioned fillers may be added to the composition of the present invention so long as the objective of the present invention is not destroyed. Adhesion promoters that may be added to the composition of the present invention include, but are not limited to, 3-mercaptopropyltrimethoxysilane, 3-mercaptopropylmethyldimethoxysilane, N-(2-aminoethyl)-3-aminopropyltrimethoxysilane, N-(2-aminoethyl)-3-aminopropylmethyldimethoxysilane, 3-aminopropyltrimethoxysilane, 3-aminopropyltriethoxysilane, 3-methacryloxypropyltrimethoxysilane, 3-methacryloxypropylmethyldimethoxysilane, 3-glycidoxypropyltrimethoxysilane, 3-glycidoxypropylmethyldimethoxysilane, 2-(3,4-epoxycyclohexyl)ethyltrimethoxysilane, vinyltrimethoxysilane, and allyltrimethoxysilane. Heat resistance agents that may be added to the composition of the present invention include, but are not limited to, rouge, black rouge, yellow rouge, cerium oxide, cerium silanoate, cerium salts of fatty acids, iron octylate, and barium zirconate. Flame retardants that may be added to the composition of the present invention include, but are not limited to, benzotriazole, zinc carbonate, manganese carbonate, platinum compounds, and antimony oxide. Plasticizers that may be added to the composition of the present invention include, but are not limited to, phthalic acid esters, adipic acid esters, maleic acid esters, fumaric acid esters, and phosphoric acid esters. Processing aids that may be added to the composition of the present invention include, but are not limited to, stearic acid, sodium stearate, fatty acid esters, and fatty acid amides. Diluents that may be added to the composition of the present invention include, but are not limited to, polyorganopolysiloxanes.

The thermally conductive silicone rubber compositions of the present invention can be prepared by the uniform blending of components (A) through (D) along with any of the optional ingredients, using a kneader-mixer, a "BANBURY" mixer, a two roll mill or other mixing apparatus. "BANBURY" is a registered trademark of USM Corp. of Boston, Mass. The composition of the present invention may be prepared by uniformly blending components (A) and (B) in a kneader-mixer or a Banbury mixer to make a silicone rubber base. Components (C) and (D) may then be blended into this silicone rubber base using a two roll mill.

This invention also relates to the thermally conductive silicone rubber obtained by heating the composition consisting of (A) 100 parts by weight of an polyorganosiloxane have an average unit formula of $R^1{}_a SiO_{(4-a)/2}$ where each $R^1$ is individually selected from the group consisting of substituted and unsubstituted monovalent hydrocarbon groups, and a is a number between 1.8 and 2.3; (B) 10–500 parts by weight of a thermally conductive inorganic filler; (C) 0.01–50 parts by weight of an organosilicon compound having in each molecule at least 3 groups represented by the general formula:

$HR^1{}_2Si$ where $R^1$ is as defined above; and (D) an amount of an organic peroxide sufficient to cure the composition. The thermally conductive silicone rubber composition of the present invention can be rapidly cured by heating the composition. The resulting thermally conductive silicone rubber has a low permanent compression strain ratio. The exact time and temperature will depend upon the type and amount of organic peroixides used. The preferred temperature is 100° to 250° C.

The thermally conductive silicone rubber obtained in this manner may be used in any form, for example, as a sheet, a roll, or a ring. The cured thermally conductive silicone rubber of the present invention can be used as a feedstock of a heat-releasing sheet for use in an electrical-electronic part, a fixing roll for an electrostatic copying machine, a printer, a fax, etc.

The present invention will be explained in detail with examples. The thermal conductivities of the silicone rubbers described in these examples were measured with Shotherm QTM. Shotherm QTM is a trade name of Showa Denko K.K., of Tokyo, Japan, and relates to the unsteady thermal wire method. Also, the permanent compression strain ratios of these thermally conductive silicone rubbers were measured at a heat-treatment temperature of 180° C. for a compression period of 22 hours in accordance with the permanent compression strain ratio test method specified in JIS K 6301 (vulcanized rubber physical test method). Furthermore, the hardness, tensile strength, elongation and other mechanical characteristics of these thermally conductive silicone rubbers were measured according to the method specified in JIS K 6301.

EXAMPLE 1

One hundred parts by weight of trimethylsiloxy-terminated dimethylsiloxane-methylvinylsiloxane copolymer (siloxane unit monomer molar ratio 99.84:0.16 respectively dimethylsiloxane units:methylvinylsiloxane units) with an average degree of polymerization of 3,000, and 200 parts by weight of alumina with an average particle diameter of 2 μm were uniformly mixed with a kneader-mixer to prepare a silicone rubber base. Next, 100 parts by weight of this silicone rubber base, 1 part by weight of an organosilicon compound represented by the formula $[H(CH_3)_2SiO]_4Si$ and 1 part by weight of 2,5-dimethylbis(2,5-t-butylperoxy)hexane were uniformly mixed on a two roll mill to prepare a thermally conductive silicone rubber composition (I). This thermally conductive silicone rubber composition (I) was sandwiched between hot plates at 170° C. A sheet-shaped thermally conductive silicone rubber was prepared by heating the sandwiched composition for 10 minutes. The thermally conductive silicone rubber sheet was then heated in a convection oven at 200° C. for 4 hours. Thermal conductivity, permanent compression strain ratio and mechanical properties of this thermally conductive silicone rubber were measured. The results are shown in Table I.

EXAMPLE 2

One hundred parts by weight of trimethylsiloxy-terminated dimethylsiloxane-methylvinylsiloxane copolymer (siloxane unit monomer molar ratio of 99.84:0.16 respectively dimethylsiloxane units: methylvinylsiloxane units) with an average degree of polymerization of 3,000, 100 parts by weight of alumina with an average particle diameter of 1 μm, and 100 parts by weight of quartz with an average particle diameter of 5 μm were uniformly mixed with a kneader-mixer to prepare a silicone rubber base. Next, 100 parts by weight of this silicone rubber base, 1 part by weight of an organosilicon compound represented by the formula $[H(CH_3)_2SiO]_3Si\text{-}C_2H_4\text{-}Si[OSi(CH_3)_2H]_3$ and 1 part by weight of 2,5-dimethylbis(2,5-t-butylperoxy)hexane were uniformly mixed on a two roll mixer to prepare a thermally conductive silicone rubber composition (II). This thermally conductive silicone rubber composition (II) was heated in the same manner as the composition in Example 1 was heated to prepare a sheet-shaped thermally conductive silicone rubber. The thermal conductivity, permanent compression strain ratio, and mechanical properties of this thermally conductive silicone rubber were measured. The results are shown in Table I.

COMPARATIVE EXAMPLE 1

A thermally conductive silicone rubber composition (III) was prepared in the same manner as the composition in Example 1 except that the organosilicon compound represented by the formula $[H(CH_3)_2SiO]_4Si$ in Example 1 was not blended. This thermally conductive silicone rubber composition (III) was heated in the same manner as the composition in Example 1 was heated to prepare a sheet-shaped thermally conductive silicone rubber. The thermal conductivity, permanent compression strain ratio, and mechanical properties of this thermally conductive silicone rubber were measured. The results are shown in Table I.

COMPARATIVE EXAMPLE 2

A thermally conductive silicone rubber composition (IV) was prepared in the same manner as the composition in Example 2, except that the organosilicon compound represented by the formula $[H(CH_3)_2SiO]_3Si\text{-}C_2H_4\text{-}Si[OSi(CH_3)_2H]_3$ in Example 2 was not blended. This thermally conductive silicone rubber composition (IV) was heated in the same manner as the composition in Example 1 was heated to prepare a sheet-shaped thermally conductive silicone rubber. The thermal conductivity, permanent compression strain ratio, and mechanical properties of this thermally conductive silicone rubber were measured. The results are shown in Table I.

COMPARATIVE EXAMPLE 3

A thermally conductive silicone rubber composition (V) was prepared in the same manner as in Example 1, except that 1 part by weight of the dimethylsiloxane-methylhydrogensiloxane copolymer represented by the formula $$(CH_3)_3SiO[(CH_3)_2SiO]_3[H(CH_3)SiO]_5Si(CH_3)_3$$

was used instead of the organosilicon compound represented by the formula $$[H(CH_3)_2SiO]_4Si$$

as was used in Example 1. This thermally conductive silicone rubber composition (V) was heated in the same manner as the composition in Example 1 was heated to prepare a sheet-shaped thermally conductive silicone rubber. The thermal conductivity, permanent compression strain ratio, and mechanical properties of this thermally conductive silicone rubber were measured. The results are shown in Table I.

COMPARATIVE EXAMPLE 4

A thermally conductive silicone rubber composition (VI) was prepared in the same manner as in Example 1, except that 1 part by weight of the dimethylpolysiloxane represented by the formula $$H(CH_3)_2SiO[(CH_3)_2SiO]_{10}Si(CH_3)_2H$$

was used instead of the organosilicon compound represented by the formula $$[H(CH_3)_2SiO]_4Si$$

as was used in Example 1. This thermally conductive silicone rubber composition (VI) was heated in the same manner as the composition in Example 1 was heated to prepare a sheet-shaped thermally conductive silicone rubber. The thermal conductivity, permanent compression strain ratio, and mechanical properties of this thermally conductive silicone rubber were measured. The results are shown in Table I.

That which is claimed:

1. A silicone composition, curable to a thermally conductive silicone rubber, consisting of (A) 100 parts by weight of a polyorganosiloxane having the average unit formula $$R^1_a SiO_{(4-a)/2}$$

where $R^1$ is a substituted or unsubstituted monovalent hydrocarbon radical, and a is a number between 1.8 and 2.3, inclusive;

(B) 10–500 parts by weight of a thermally conductive inorganic filler;

(C) 0.01–50 parts by weight of an organosilicon compound having in each molecule at least 3 groups represented by a general formula $$HR^1_2Si$$

where $R^1$ is a substituted or unsubstituted monovalent hydrocarbon radical; and (D) 0.1–10 parts by weight of an organic peroxide.

2. The silicone composition described in claim 1, wherein component (C) is an organosilicon compound represented by the general formula $$(HR^1_2SiO)_x R^1_{(4-x)}Si$$

where $R^1$ is a substituted or unsubstituted monovalent hydrocarbon radical and x is 3 or 4.

3. The silicone composition described in claim 1, wherein component (C) is an organosilicon compound represented by the general formula $$(HR^1_2SiO)_3Si\text{-}R^2\text{-}Si(OSiR^1_2H)_3$$

where $R^1$ is a substituted or unsubstituted monovalent hydrocarbon radical and $R^2$ is an alkylene group.

4. The silicone composition described in claim 1, wherein component (B) is alumina.

5. The silicone composition described in claim 2, wherein component (B) is alumina.

6. The silicone composition described in claim 3, wherein component (B) is alumina.

7. The thermally conductive silicone rubber obtained by (1) mixing

TABLE I

|  | Present Invention | Present Invention | Comparative Example | Comparative Example | Comparative Example | Comparative Example |
|---|---|---|---|---|---|---|
| Thermally Conductive Silicone Rubber | I | II | III | IV | V | VI |
| Thermal Conductivity (cal/(cm. sec. C)) | $1.9 \times 10^{-3}$ | $1.6 \times 10^{-3}$ | $1.9 \times 10^{-3}$ | $1.6 \times 10^{-3}$ | $1.9 \times 10^{-3}$ | $1.9 \times 10^{-3}$ |
| Permanent Compression Strain Ratio (%) | 10 | 7 | 25 | 15 | 22 | 25 |
| Hardness (JIS A) | 50 | 55 | 50 | 55 | 50 | 48 |
| Tensile Strength (MPa) | 2.5 | 4.0 | 2.5 | 4.0 | 2.5 | 2.5 |
| Elongation (%) | 200 | 180 | 200 | 180 | 200 | 220 |

(A) 100 parts by weight of a polyorganosiloxane having the average unit formula $$R^1_a SiO_{(4-a)/2}$$

where $R^1$ is a substituted or unsubstituted monovalent hydrocarbon radical, and a is a number between 1.8 and 2.3;

(B) 10–500 parts by weight of a thermally conductive inorganic filler;

(C) 0.01–50 parts by weight of an organosilicon compound having in each molecule at least 3 groups represented by a general formula $$HR^1_2 Si$$

where $R^1$ is a substituted or unsubstituted monovalent hydrocarbon radical; and (D) 0.1–10 parts by weight of an organic peroxide; and (2) heating the resulting composition for a sufficient time and at a sufficeint temperature to cure the composition.

8. The thermally conductive silicone rubber of claim 7, wherein component (C) is an organosilicon compound represented by the general formula $$(HR^1_2 SiO)_x R^1_{(4-x)} Si$$

where $R^1$ is a substituted or unsubstituted monovalent hydrocarbon radical and x is 3 or 4.

9. The thermally conductive silicone rubber of claim 7, wherein component (C) is an organosilicon compound represented by the general formula $$(HR^1_2 SiO)_3 Si\text{-}R^2\text{-}Si(OSiR^1_2 H)_3$$

where $R^1$ is a substituted or unsubstituted monovalent hydrocarbon radical and $R^2$ is an alkylene group.

10. The thermally conductive silicone rubber of claim 7, wherein component (B) is alumina.

11. The thermally conductive silicone rubber of claim 7, wherein component (B) is alumina and component (C) is an organosilicon compound represented by the general formula $$(HR^1_2 SiO)_x R^1_{(4-x)} Si$$

where $R^1$ is a substituted or unsubstituted monovalent hydrocarbon radical and x is 3 or 4.

12. The thermally conductive silicone rubber of claim 7, wherein component (B) is alumina and component (C) is an organosilicon compound represented by the general formula $$(HR^1_2 SiO)_3 Si\text{-}R^2\text{-}Si(OSiR^1_2 H)_3$$

where $R^1$ is a substituted or unsubstituted monovalent hydrocarbon radical and $R^2$ is an alkylene group.

* * * * *